Jan. 30, 1945.                J. C. SMITH                 2,368,170
                       MACHINE FOR FABRICATING GLASS
                          Filed May 7, 1942          7 Sheets—Sheet 2

Inventor:
Jesse Conrad Smith,
By Spear, Rawlings & Spear.
Attorneys

Jan. 30, 1945. J. C. SMITH 2,368,170
MACHINE FOR FABRICATING GLASS
Filed May 7, 1942 7 Sheets-Sheet 3

Inventor:
Jesse Conrad Smith,
by Spear, Rawling & Spear.
Attorneys

Jan. 30, 1945.	J. C. SMITH	2,368,170
MACHINE FOR FABRICATING GLASS
Filed May 7, 1942	7 Sheets-Sheet 4

Inventor:
Jesse Conrad Smith,
By Spear, Rawlings & Spear.
Attorneys

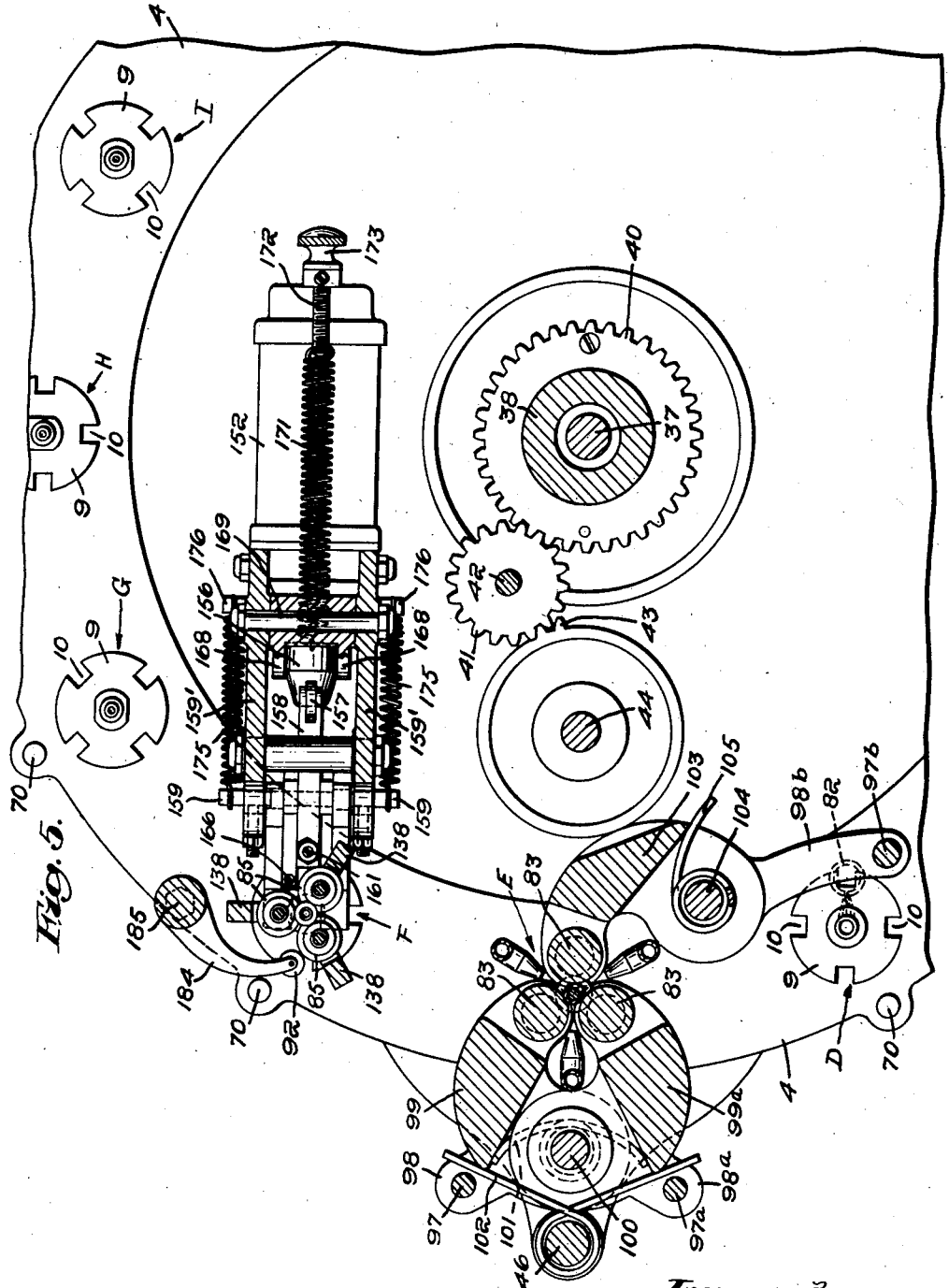

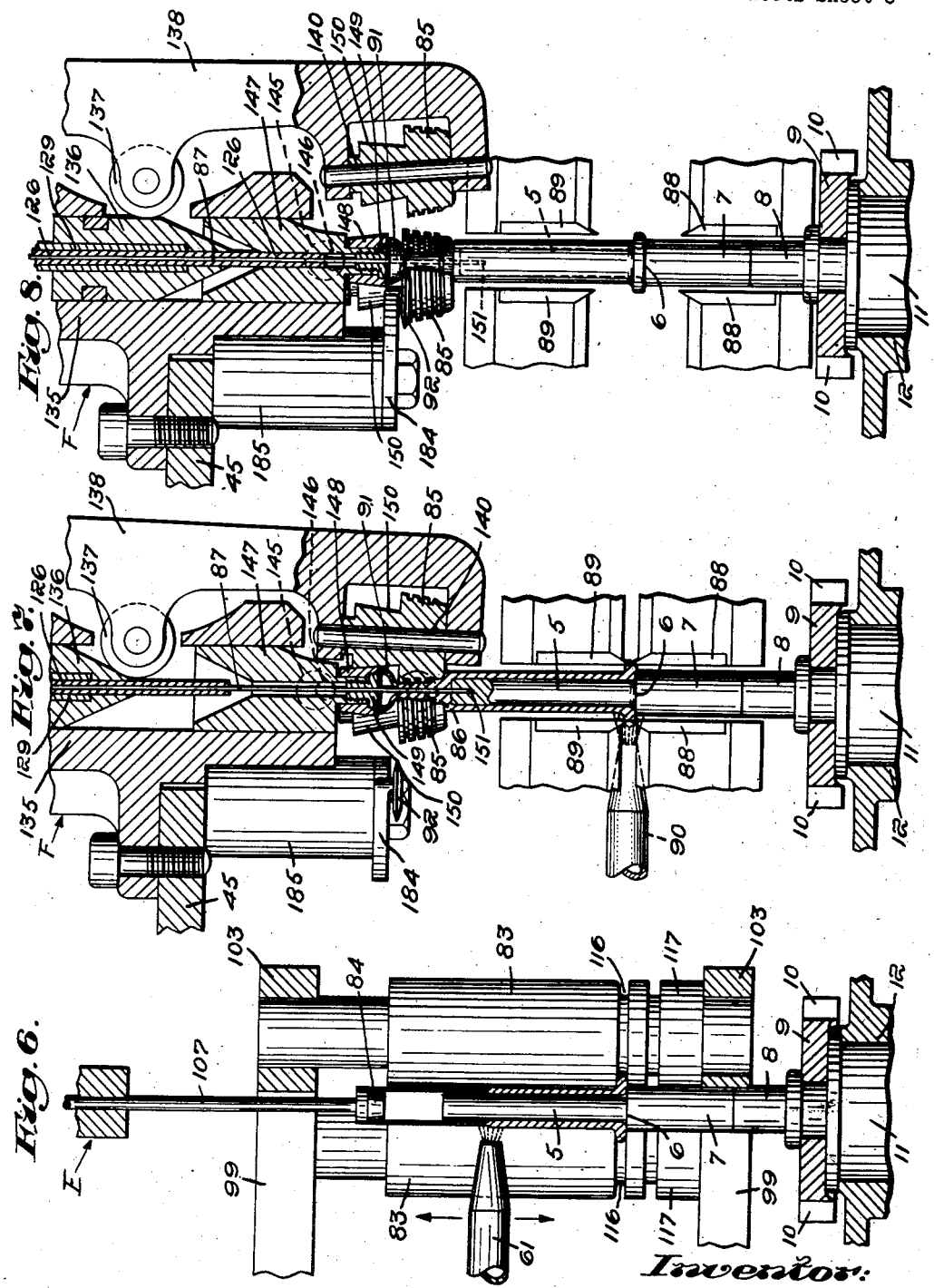

Jan. 30, 1945.  J. C. SMITH  2,368,170
MACHINE FOR FABRICATING GLASS
Filed May 7, 1942  7 Sheets-Sheet 7

INVENTOR.
Jesse Conrad Smith,
BY
Spear, Rawlings & Spear
ATTORNEYS

Patented Jan. 30, 1945

2,368,170

UNITED STATES PATENT OFFICE 2,368,170

MACHINE FOR FABRICATING GLASS

Jesse Conrad Smith, Merrick, N. Y., assignor to MacGregor Instrument Company, Needham, Mass., a corporation of Massachusetts Application May 7, 1942, Serial No. 442,024

12 Claims. (Cl. 49—7)

This invention relates to machine for fabricating from glass tubing shaped articles of uniform internal diameter and capacity, such as the cylindrical barrels of hypodermic syringes.

The general object of my present invention is to provide a machine for producing in commercial quantities and at relatively low cost cylindrical syringe barrels, or other articles, which are substantially uniform in diameter from end to end thereof and hence need not be subjected to grinding operations to bring them to cylindricity.

By my invention I am able to consistently hold the diameter variations of my syringe barrels to such extremely close tolerances (in the order of plus or minus .0001 of an inch) that for all practical purposes my barrels may be considered to be identical in capacity and diameter. Moreover, these tolerances are maintained throughout the full length of the barrel, thus insuring accurate fit of the mating plunger throughout its entire working stroke in the barrel.

In carrying out my invention I subject blanks of glass tubing of approximately the internal and external diameters required for the finished barrels, or other articles, to a series of fire-sizing and shaping operations which brings the internal and external diameters of the blanks to the precise dimension wanted, without grinding, and simultaneously gives the barrels their required external configuration.

My machine includes an intermittently rotatable turret on which is mounted a plurality of equi-distantly spaced continuously rotating arbors carrying blanks in various stages of processing. The turret is progressively indexed step by step through a circular path so as to carry each arbor into and out of the zones of action of a number of different work stations arranged adjacent said path. Both the arbors and the stations are spaced apart from each other distances corresponding substantially to the distance that the turret advances at each step. The indexing movement of the turret is discontinued and the turret locked as each arbor is brought opposite each work station so that the blank on such arbor may be acted upon by the particular instrumentalities at such station.

The first position in the turret cycle is a loading position at which a blank is placed on an arbor.

Following the loading position is one or more pre-heating positions at which each blank is subjected to pre-heating flame from stationary burners.

Following the last pre-heating position, if there be more than one, is a barrel-sizing station at which each preheated blank is subjected to a fire-sizing and shaping operation accompanied by end-pressure thereon to bring its inside diameter to the exact arbor diameter and to change its outside diameter from a smaller to a larger diameter than that of the original blank. A flange is also formed on the lower end of the blank at this station.

Following the barrel-sizing station is a tip-forming station at which each blank is subjected to a fire-shaping operation which forms a tip, with hollow bore, on the upper end of the blank. Either at this station, or if desired at some later station, the globule of excess glass incidental to the formation of the tip is cut off. Either at this station, or if desired at some later station, opposite edges of the barrel flange may also be slabbed off. These cutting operations are independently performed by appropriate cutters operating in time to the indexing of the turret. During the flange cutting operation the arbor is momentarily locked against rotation about its own axis.

The instrumentalities for performing the barrel-sizing and tip-forming operations include independent sets of appropriately shaped rolls. The rolls of each set are equi-distantly spaced and each set of rolls is mounted to open and close as a unit. Each set of rolls is opened just before the turret starts its indexing movement so as to permit an arbor to be centered therebetween; is closed to act upon the blank while the turret is paused in its indexing movement; and is again opened to permit the arbor to pass from between the rolls when the rolls have completed their work and the turret is ready to resume its indexing movement. When closed, the rolls frictionally contact the sizing arbor and are rotated thereby about their own axes, softening heat being simultaneously applied to the rotating blank to enable it to be worked by the rolls.

At the barrel-sizing station, such softening heat is applied to the rotating blank in a narrow band by means of one or more flames which progressively traverse the blank substantially from end to end while the blank is simultaneously being compressed from one end. Such endwise compression upsets the softened glass, which thereupon expands into contact with either the arbor or the barrel-sizing rolls, or both, thus preventing further change in the inside and outside diameters of the blank while the rolls are at work, but producing an enlarged glass portion or ring which as the softening flames traverse the blank is gradually converted into a tube of greater diameter than its original diameter and the inside wall thereof is given the same diameter as the arbor.

At the tip-forming station, the softening flame need not traverse the tip, but in order to form a bore through the tip and to support the tip against collapse during formation, I insert into the open end of the blank from above at the proper time a retractible wire, which wire is automatically withdrawn when the tip is completed and the turret ready to resume indexing.

Following the tip-forming station are one or more positions at which the formed barrel may be given such final fire-polishing operations as are required.

Following these positions are cooling positions at which the finished barrel is progressively cooled until it reaches a final position at which it is cool enough to permit its removal from the arbor.

In the accompanying drawings, wherein I have illustrated a machine which I have found satisfactory for the commercial production of uniformly dimensioned syringe barrels:

Fig. 3 is a section on the line 3—3 of Fig. 1, showing the turret locked and the barrel sizing and shaping rolls at the barrel-sizing station at work.

Fig. 6 is an enlarged view, partly in section, more particularly detailing the barrel-sizing and shaping operation illustrated in Fig. 3.

Fig. 7 is an enlarged view, partly in section, more particularly detailing the tip-forming operation illustrated in Fig. 4, and also showing the flange cutters in position to shear off opposite edges of the barrel flange.

Fig. 8 is a view similar to Fig. 7 but showing the tip as having been formed and the tip-forming rolls as having opened, this view also showing the flange cutters as having opened after completing their cutting stroke, and the cutter for cutting off the globule of excess glass at the tip as having commenced to cut.

Figure 9:
Fig. 9 is a side view of the blank from which the hypodermic syringe barrel depicted in Fig. 10 is formed.
Figure 10:
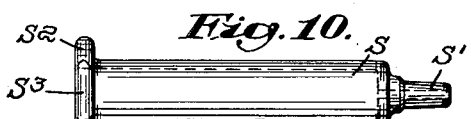
Fig. 10 is a side view of the formed barrel.
Figure 11:
Fig. 11 is a side view of a complete hypodermic syringe.

Referring to Figs. 9, 10 and 11, the barrel blank 81 (Fig. 9) is a glass tubing of predetermined dimensions. Such blanks may be pre-selected from ordinary tubing, or may be pre-sized.

The syringe barrel S of Fig. 10 is fabricated from blank 81. Such barrel has a reduced conical tip S' at one end, with hollow bore therethrough, and an enlarged flange S² at its opposite end, said flange preferably being slabbed off at opposite sides as at S³. The external surface of the barrel is provided with a conventional dosage scale S⁴.

When assembled as a hypodermic syringe, a needle T is mounted on the barrel tip, and a headed plunger U is mounted to slide within the open end of the barrel.

The over-all length of the barrel is substantially the same as that of the portion of the plunger which slides within the barrel. The edge of the plunger head adjacent the barrel flange is formed as a shoulder U' which contacts the barrel flange just before the forward end of the plunger contacts the forward end wall of the barrel to thereby limit the penetration of the plunger in the barrel and prevent breakage of such end wall by reason of too severe contact of the plunger therewith.

The machine for fabricating the blanks into syringe barrels having the aforesaid characteristics is structurally depicted in Figs. 1 to 5 inclusive and certain of its operating effects are diagrammatically depicted in Figs. 6, 7, and 8.

Figure 1:
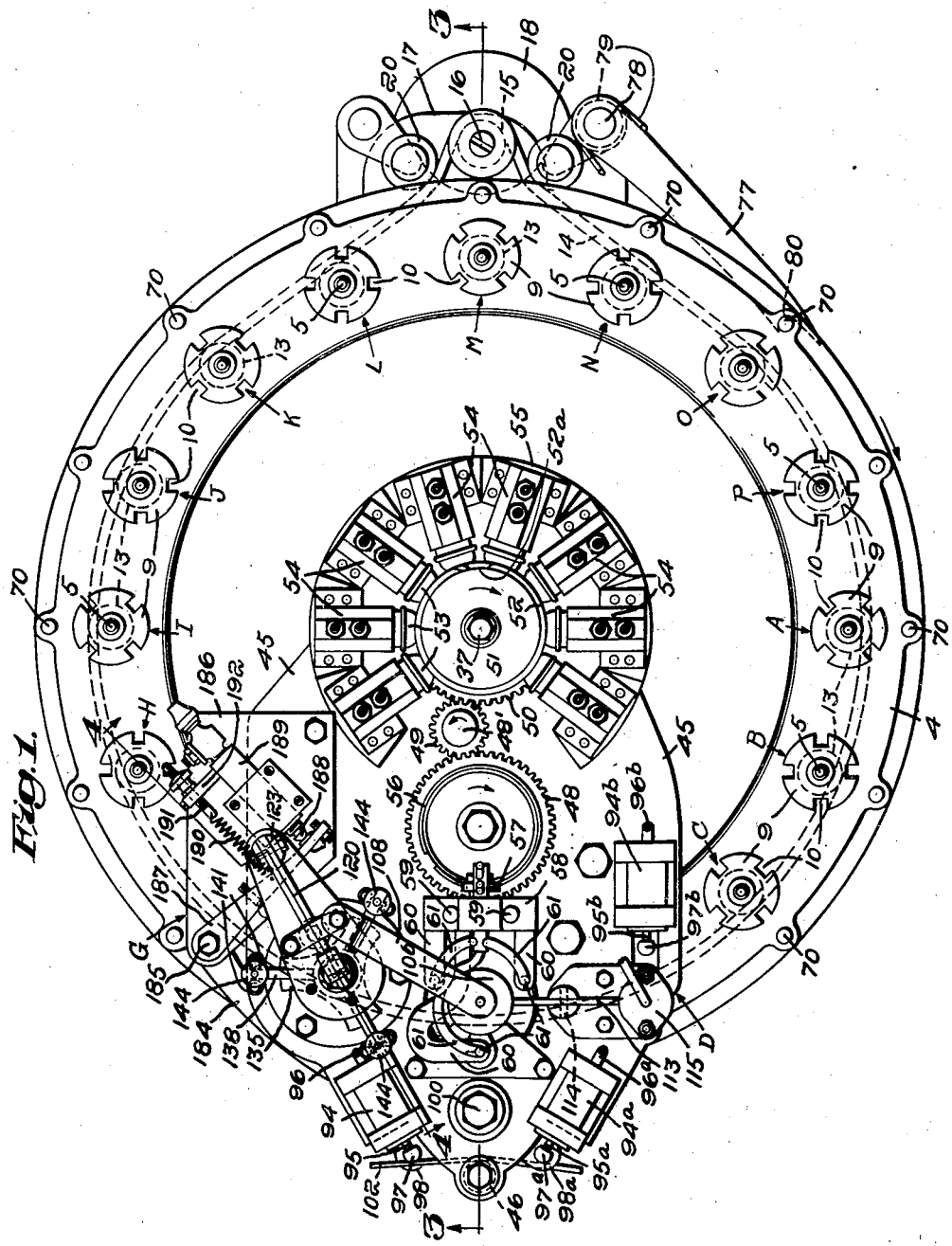
Fig. 1 is a top plan view of a machine embodying the principles of my invention.

Referring to Fig. 1, I have designated by the reference characters A to P inclusive, different positions or stations in the clockwise cycle of the turret.

Position A is an idle position between the loading position B at which blank 81 is inserted endwise from above on one of the continuously revolving arbors 5 carried by the turret and the unloading position P at which the formed and cooled barrel is removed from the machine.

Positions C and D, are preheating positions. While the turret is paused in its intermittent rotation at these positions, the rotating blank 81 is subjected to preheating flame from one or more stationary preheating burners 82 (Fig. 2) preferably of the ribbon type.

Stations E and F are barrel-sizing and tip-forming stations, respectively. While the turret is paused in its intermittent rotation at these stations, the preheated blank is successively subjected to fire-sizing and shaping operations which size the blank to barrel dimension and configuration and form the barrel tip.

At station E the rotating blank is sized to arbor dimension and shaped by a plurality of radially arranged sizing and shaping rolls 83 which are substantially coextensive in length with the blank. Rolls 83 automatically open and close as a unit. They open to permit the blank to enter between them while the turret is indexing, and close on the blank when the turret comes to rest. After the rolls have completed their work they automatically open again to permit the blank to leave them when the turret is ready to resume its indexing movement. While the rolls are closed, the blank is continuously bathed in softening flame substantially from end to end thereof by one or more vertically traveling burners 61. Simultaneously end pressure to insure adequate flow of the softened glass for the formation of the barrel flange is exerted on the upper end of the blank by means of a weight actuated follower 84 (see Fig. 6) which is automatically lowered and raised in time to the indexing of the turret.

At station F, the tip is formed on the rotating blank by a plurality of radially arranged tip forming rolls 85 (see Fig. 7) which likewise open to permit the blank to enter them while the turret is indexing, close on the blank when the turret comes to rest, and again open to permit the blank to leave them when the turret is ready to resume its indexing movement. These rolls may in fact open and close on the tip several times while the turret is paused in its rotation in order to completely form the tip. While rolls 85 are at work the tip is continuously bathed in softening flame from at least one stationary burner 86 and has a bore formed therein and is supported against collapse by a retractible bore-forming wire 87 which enters a hole 151 in the upper end of the arbor when the turret comes to rest and is automatically withdrawn therefrom when the turret is ready to resume indexing.

While at station F the blank is momentarily locked against rotation while two opposite edges of the barrel flange are slabbed off by means of two oppositely disposed pairs of vertically opening and closing shearing cutters 88 and 89. During this cutting action, the barrel flange is bathed in a softening flame from a stationary burner 90 (see Fig. 7) which smoothes or fire-polishes the cut edges of the flange.

While at station F, but after the tip has been completed and the barrel flange slabbed off, the globule of excess glass 91 at the tip of the rotating blank is cut off (see Fig. 8) by means of a pivoted cutter 92 operating in time with the tip-forming rolls. Cutter 92 is swung into cutting contact with said globule while the tip is still being formed and is swung away from the blank when the turret is ready to resume its indexing movement.

The remaining positions, designated I to O, are idle positions, cooling of the blanks at these stations occurring by reason of their being exposed to the atmosphere.

Figure 2:
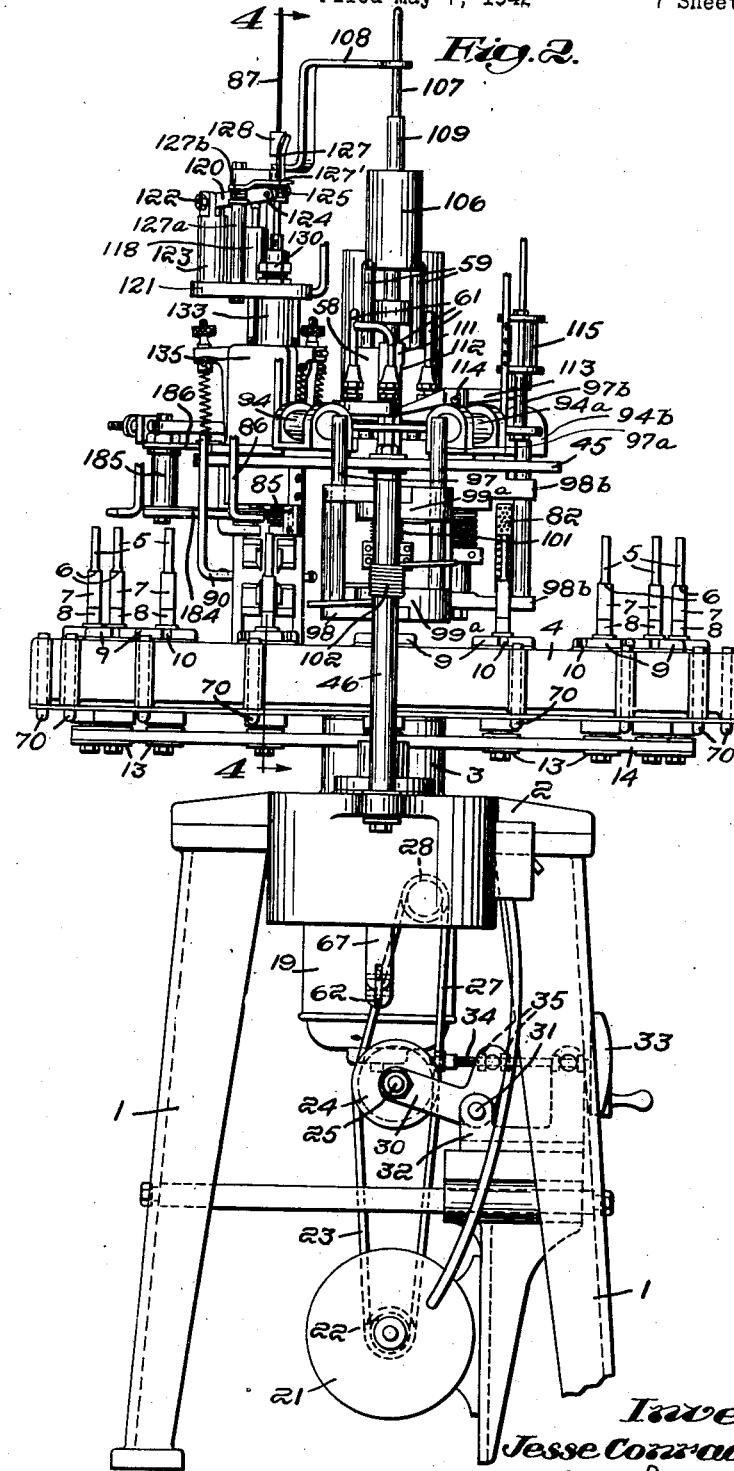
Fig. 2 is an elevation thereof as seen from the left of Fig. 1.
Figure 5:
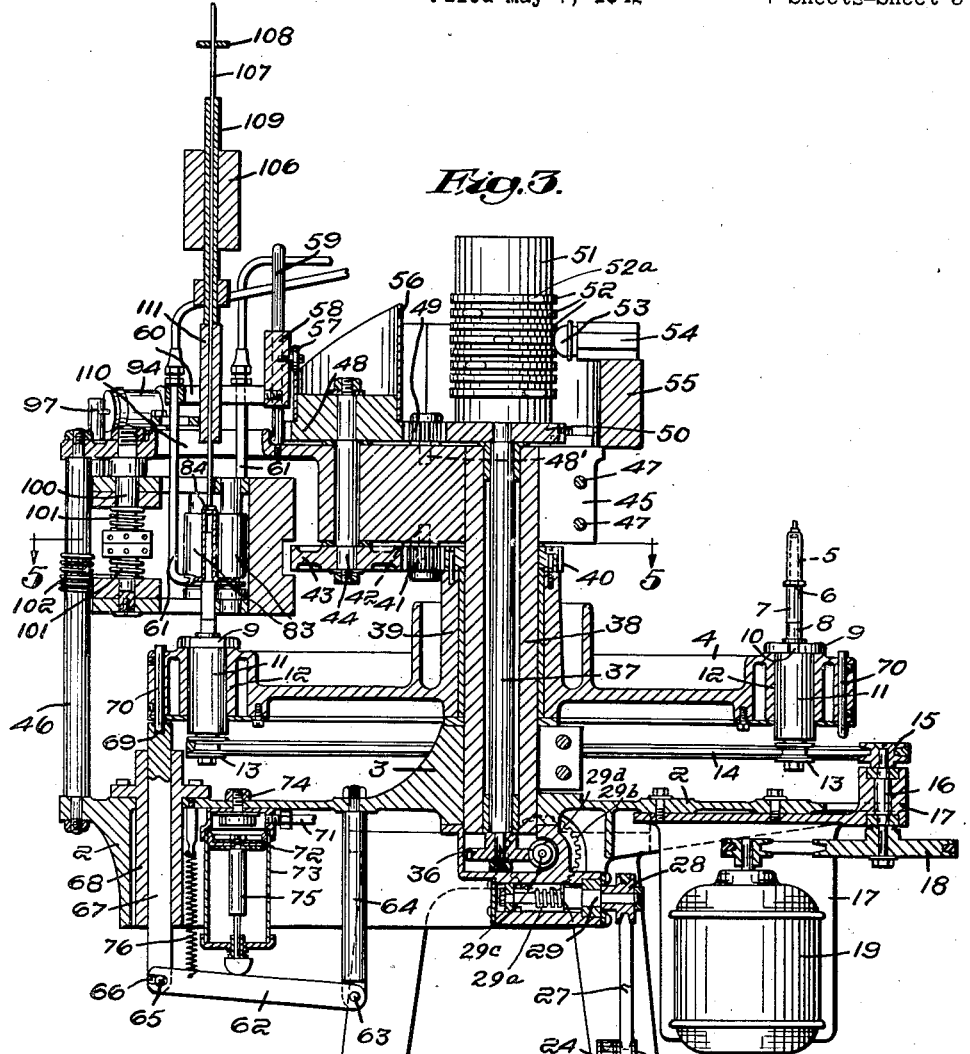
Fig. 5 is a section on the line 5—5, of Fig. 3.

The turret and associated parts above referred to are all supported on a suitable frame. Referring to Fig. 2 the supporting legs of the frame are designated at 1. Surmounting the legs is a flat top plate 2 formed with a central housing 3 (Fig. 3) providing a support for the intermittently revoluble turret 4. The turret 4 is disposed in a horizontal plane parallel to the top plate 2 and is spaced therefrom a distance sufficient to accommodate the driving belt 14 for the spindles 8 of a plurality of continuously rotating equidistantly spaced blank supporting arbors 5.

Arbors 5 are vertically arranged about the circumference of the turret 4 and are preferably spaced from one another distances corresponding to the distance that the turret is indexed each step in its revolution.

Each arbor 5 is shouldered as at 6 and below said shoulder carries a sizing roll 7 (see Figs. 6, 7, and 8) which is assembled in any suitable manner to a driving spindle 8. Each spindle 8 has a base portion 9 disposed closely adjacent the top face of the turret and provided with a series of spaced peripheral locking notches 10 (see Figs. 1 and 5) the purpose of which is to enable each spindle to be temporarily locked against rotation about its own axis when the flange cutters 88—89 operate, as will be later explained in connection with the description of said flange cutters.

Spindles 8 are supported by suitable anti-friction bearings (not shown) in vertical holders 11 (Fig. 3). Each holder 11 is fixed in a bearing 12 in the turret and is provided at its lower end with a driven pulley 13. All pulleys 13 except the pulley at station M are driven by the common belt 14 located in the space between turret 4 and top plate 2.

Belt 14 is continuously driven by a driving pulley 15 mounted on the upper end of a pulley shaft 16 which is journalled vertically in a bracket 17 fastened to the under side of top plate 2. Pulley shaft 16 is continuously rotated by a pulley 18 fast on the lower end of said shaft and driven from motor 19 hung from bracket 17 through any suitable driving connections, as a pulley on the motor shaft and a belt connecting that pulley with pulley 18 (see Fig. 3). Belt 14 may be tensioned in any suitable manner as by means of a pair of tensioning rolls 20 (see Fig. 1).

Turret 4 is rotated step by step by a motor 21 (see Fig. 2) supported in any suitable manner between the legs 1 of the machine frame. Fast on the shaft of said motor is a pulley 22 driving a belt 23 which is trained over a tension pulley 24 mounted on a shaft 25. Fast on shaft 25 is a second pulley 26 (see Fig. 3) which is belted at 27 to a pulley 28 on a stub shaft 29 suitably supported from the frame top 2.

Tension pulley 24 is adjusted by means of a toggle 30 (see Fig. 2) which is pivoted at 31 to a bracket 32 slidable transversely of the machine frame by any well known means, such as a hand wheel 33 through screw shaft 34 and nuts 35 so that both belts 23 and 27 may be simultaneously adjusted.

Stub shaft 29, through conventional reduction gearing, drives main shaft 37 of the machine. Such gearing may comprise a worm $29^a$ on shaft 29 meshing with a worm gear $29^b$ on worm shaft $29^c$. Worm shaft $29^c$ has a worm $29^d$ thereon meshing with worm 36 on shaft 31. Shaft 37 is vertically journaled in a sleeve 38 extending through the housing 3 of the frame top 2 and through a central bearing 39 integral with turret 4.

Fastened to the top face of bearing 39 is a gear 40 (Figs. 3 and 5) meshing with a pinion 41 on a stub shaft 42. Pinion 41 also meshes with a stepping gear 43 on the lower end of a cam shaft 44. Gear 43 has only two teeth and consequently turret 4 will be stepped clockwise only one arbor station for each complete revolution of gear 43. Stub shaft 42 and cam shaft 44 are both journaled vertically in a stationary head plate 45 supported at one end of the frame top 2 by means of a tie rod 46 and clamped at its other end by means of tie rods 47 about sleeve 38.

Fast to the upper end of cam shaft 44 is a gear 48 (Figs. 1 and 3) which meshes with a pinion 49 on a stub shaft 48' journaled vertically in head plate 45. Pinion 49 is driven by means of gear 50 on the upper end of main shaft 37.

Fixed to the upper face of gear 50 is a multiple ring timing cam 51, having a plurality of vertically spaced circular cam rings 52 having dwells $52^a$ for timed coaction with the piston slide valves 53 of a plurality of laterally disposed cylinders 54 arranged concentrically about said cam (see Figs. 1 and 3). Cylinders 54 are mounted at different elevations on a bracket 55 fixed to the upper face of head plate 45.

Figure 12:
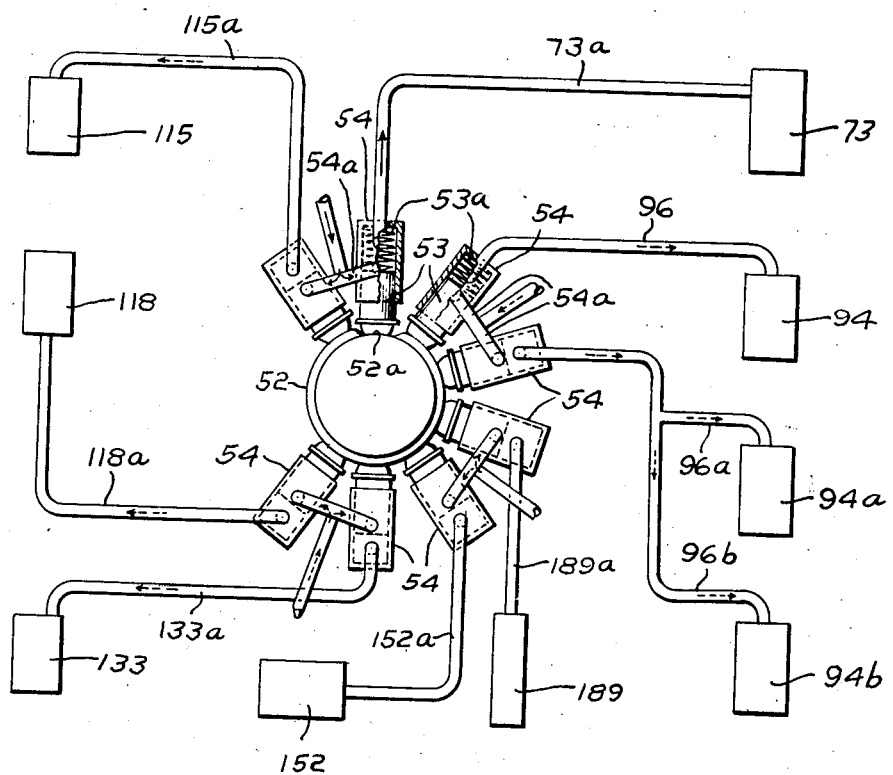
Fig. 12 is a diagrammatic view showing the piping from the cam-actuated piston slide valves to the various operating cylinders which they control.

Pistons 53 control the supply of oil, air, or other pressure medium to individual hydraulic cylinders 73, 94, $94^a$, $94^b$, 115, 118, 133, 152 and 189, which at the proper time operate, respectively, the turret locking rod 67, the sizing rolls 83, the retractible end pressure device 84, the retractible tip-bore forming wire 87, the tip forming rolls 85, the flange cutters 88—89, and the globule cutter 92. This is diagrammatically indicated in Fig. 12 wherein the several valve pistons 53 are shown as being normally urged towards their respective cam rings 52 by compression springs $53^a$. When during rotation of the cam 51, the pistons drop into the dwells $52^a$ of their respective cams, the pressure medium, which is supplied from a common pressure source (not shown), is admitted as at $54^a$ to the valve-cylinders 54 and is set therefrom to the various operating cylinders through the pipes $73^a$, 96, $96^a$, $96^b$, $115^a$, $118^a$, $133^a$, $152^a$ and $189^a$.

Sleeved about gear 48 on cam shaft 44 is a barrel cam 56 with which coacts a cam roll 57 (see Figs. 1 and 3) fast to a vertically sliding plate 58 which is guided on fixed guide rods 59 rising from head plate 45. Extending laterally from slide plate 58 is a plurality of arms 60, here shown as three, in which are clamped a plurality of burners 61 which are supplied from any suitable supply source (not shown). Softening flames from the vertically moving burners 61 traverse the blank substantially from end to end while it is paused at station E and the sizing rolls 83 are at work.

Before turret 4 may be indexed by means of stepping gear 43, it must be unlatched. This is accomplished through rocker arm 62 (see Fig. 3) which is intermittently actuated in time to the indexing of the turret by the piston of a pneumatic or hydraulic pressure cylinder 73 under the control of one of the cam rings 52.

Rocker arm 62 is pivoted at one end at 63 to a support 64 depending from frame plate 2. Fastened to the other end of the rocker arm in any suitable manner, as by the pin and slot connections 65 and 66, is a turret-locking rod 67 which reciprocates in a vertical bearing 68 fixed in frame plate 2.

The upper end of rod 67 is socketed as at 69 to successively engage a series of vertically positioned turret-locking pins 70. Pins 70 are spaced from each other about the periphery of the turret distances corresponding to the distance that the turret rotates at each step and when engaged by rod 67 positively lock the turret in its indexed position. Said pins are fixedly mounted on the turret opposite to but laterally outward of the arbors 5.

Locking rod 67 is actuated through rocker arm 62 in properly timed relation to the stepping of the turret by air, oil or other medium under pressure from supply line 71 acting against piston 72 of cylinder 73.

Cylinder 73 is supported as at 74 (see Fig. 3) from the underside of frame plate 2 and the piston rod 75 of its piston 72 is extended through the lower end of the cylinder and when actuated engages the rocker arm 62 and rocks it downwardly on its pivot 63 against the action of a return spring 76 which is fastened at its respective ends to arm 62 and to frame plate 2. The downward motion of rocker arm 62 causes the socket 69 of rod 67 to withdraw from whichever pin 70 it was in engagement.

In order to prevent backlash of the turret, due primarily to the fact that pulley belt 14 is continuously rotating in a direction counter to the direction of indexing movement of the turret, I provide a notched finger 77 (see Fig. 1) which is pivoted at one end at 78 to bracket 17 and is spring tensioned as at 79.

The free end of finger 77, which is notched as at 80, is normally urged by spring 79 into the rotative path of the pins 70, but notch 80 is open in the direction of rotation of the turret so that pins 70 may successively ride therepast during indexing of the turret. As the turret completes each step, one of the pins 70 will automatically enter said notch thereby preventing backlash of the turret.

The preheated blank is sized and shaped to barrel form at station E and the flange S² formed on its lower end.

During the stepping of the turret to advance the blank from preheating position D to station E, the sizing and shaping rolls 83 are automatically opened to admit the blank therebetween, are then closed around the blank as the turret comes to rest and is locked against indexing, and are again opened to permit the blank to leave the rolls when the rolls finish their work and the turret is ready to resume indexing.

The mechanism for opening and closing said rolls in time with the indexing of the turret includes pressure cylinders 94, 94ᵃ, 94ᵇ to which oil or other medium under pressure is admitted at the proper time behind the pistons 95, 95ᵃ, 95ᵇ thereof from pipes 96, 96ᵃ, 96ᵇ connecting with any suitable supply source (not shown). The admission of the pressure medium to the cylinder 94 is under the control of one of the cam rings 52, and the admission of the pressure medium simultaneously to both of the cylinders 94ᵃ and 94ᵇ is under the control of another of said cam rings. Preferably there is a cylinder for each roll, said cylinders being fixedly mounted on head plate 45 adjacent the rolls.

Pistons 95, 95ᵃ, 95ᵇ engage flattened portions on a plurality of shafts 97, 97ᵃ, 97ᵇ. When said pistons are projected outwardly of their cylinders they force said shafts outwardly. Said shafts are vertically mounted in the ears 98, 98ᵃ, 98ᵇ of pivoted arms 99, 99ᵃ and 103 (see Fig. 5), and rolls 83 are journaled at their ends in said arms (see Fig. 6). There are two arms 99, 99ᵃ and a single arm 103. Arms 99, 99ᵃ are pivoted around a common pivot center 100 (see Fig. 5) and are spring-tensioned as at 101 and 102. Arm 103 is pivoted on a separate pivot 104 and is spring-tensioned as at 105.

When shafts 97, 97ᵃ, 97ᵇ are forced outwardly by their respective pistons, arms 99, 99ᵃ and 103 are swung about their pivots 100 and 104 to their open position against the action of their return springs. This separates the rolls 83 a distance sufficient to permit the blank to be entered therebetween during the indexing movement of the turret, or to leave the rolls when the turret is ready to resume indexing.

When the turret stops and is latched, pistons 95, 95ᵃ, 95ᵇ retract into their cylinders and rolls 83 are closed about the blank by the arm-return springs. When closed, the rolls are in frictional contact with the sizing arbor 7 so as to be rotated thereby.

At or immediately after rolls 83 have closed on the blank, the end pressure device 84 is automatically forced downwardly into contact with the upper end of the blank to press the softened glass towards the lower end of the blank and thereby assure a sufficient quantity of glass at such zone for the formation of the barrel flange. This may be accomplished by means of a weight 106.

Pressure device 84 is fast on the lower end of a rod 107 and is of such design as to enter within the upper end of the blank when in operating position. Rod 107 is slidably guided in a fixed guide bracket 107 (see Fig. 3). Sleeved about said rod to move therewith is a protective sleeve 109 to which weight 106 is fast. Rod 107 and its sleeve 109 operate in an opening 110 in head plate 45. The lower end of sleeve 109 abuts an actuating sleeve 111 which has an elongated vertical groove 112 (Fig. 2). Sleeve 111 is fast to rod 107 so that when said sleeve is raised, rod 107 will rise therewith.

Sleeve 111 is raised by lever 113, the inner end of which rides in a shouldered groove 112 (Fig. 2). Lever 113 is pivoted between its ends at 114. Its outer end is in line with the piston of a hydraulic or other cylinder 115 mounted on a suitable bracket carried by head plate 45. The supply of pressure medium admitted to said cylinder to actuate the piston thereof is under the control of one of the cam rings 52. When the piston in cylinder 115 is projected downwardly, trip lever 113 is rocked on its pivot to raise rod 107. In this action, the inner end of the lever 113 rides upwardly along groove 112 in sleeve 111 until it contacts the shoulder at the upper end of said groove and begins to raise the sleeve. Since rod 107 is fast to the sleeve, the rod rises with the sleeve. When the supply of pressure medium to said cylinder 115 is discontinued, rod 107 gradually drops by gravity to the operating position shown in Fig. 6, thereby restoring sleeve 111 and lever 113 to their original positions.

The shaping rolls 83 are provided with annular grooves 116 of a shape and width to form the flange on the barrel. These grooves are located substantially at the shoulder 6 on arbor 5 which supports the lower end of the blank. Below said grooves 116 the rolls have sizing portions 117 to engage the sizing roll 7 of arbor 5.

During this sizing and shaping operation, softening flames from the vertically traversing burners 61 are continuously and progressively played on the blank, starting from the lower end thereof.

When flange $S^2$ has been formed on the blank and the blank has been brought to the dimension of the arbor the rolls 83 are again automatically opened by pistons 95, 95$^a$, 95$^b$, the pressure device 84 is raised by the piston of cylinder 115, and the turret rotates another step to advance the blank from station E to station F.

Figure 4:
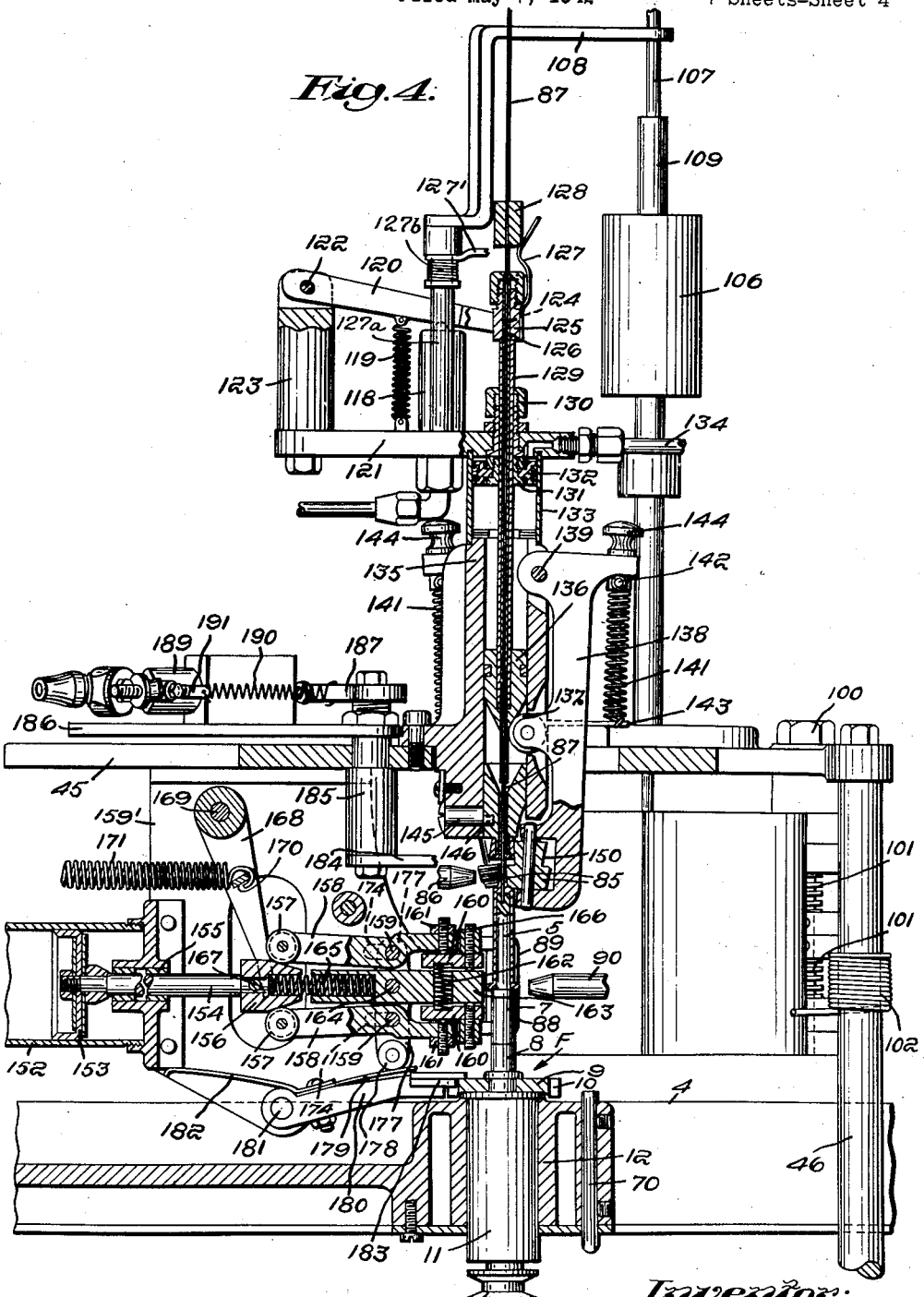
Fig. 4 is a section on the line 4—4, of either Fig. 1 or Fig. 2, showing the tip forming rolls and the flange cutters at the tip-forming station at work.

At station F the tip is formed, the flange is slabbed off, and the globule of excess glass 91 above the formed tip is cut off. Referring to Figure 4, after the turret has been stepped to advance the blank from station E to station F, and is locked at that station, the tip-bore forming rod 87 is depressed by automatically relieving the pressure in cylinder 118 by means of one of the cam rings 52. Coil spring 119, anchored at its ends respectively to arm 120 and bracket 121, thereupon draws arm 120 downwardly about its pivot 122 on upright 123 rising from bracket 121 carried by head plate 45.

The free end of arm 120 is formed to engage a pin 124 fixed in a block 125 which is axially bored to receive an inner protecting sleeve 126 for said rod 87. The inner protective sleeve 126 slides as a unit with rod 87 inside and independently of an outer protecting sleeve 129.

Sleeve 129 extends through spaced stuffing boxes 130 and 131 and is made fast to the piston 132 of a pressure cylinder 133 which opens and closes the tip-forming rolls 85 at the proper time. The supply of fluid under pressure through pipe 134 to cylinder 133 is under the control of one of the cam rings 52.

Cylinder 133 surmounts housing 135. Slidable within the bore of housing 135 is a slide 136 to which the lower end of the outer protective sleeve 129 is fast. Slide 136 is cone-shaped at its lower end and when forced downwardly by piston 132 engages a plurality of concentrically arranged cam rolls 137 mounted in arms 138.

Arms 138 are pivoted at their upper ends at 139 to housing 135, and the tip forming rolls 85 are rotatably journaled at 140 in the lower ends of arms 138. Coil springs 141 fastened at their upper ends to said arms at 142 and at their lower ends by pins 143 fastened into housing 135 normally tend to draw the lower ends of arms 138 inwardly to position the tip-forming rolls 85 in contact with the rotating blank (Figs. 4 and 7). Springs 141 may be tensioned by any suitable means as the thumb screws 144. When slide 136 is forced downwardly by piston 132 against cam rolls 137, the arms 138 are spread apart against the action of their return springs 141 to thereby open the rolls 85. Thus the rolls 85 are automatically opened to permit the barrel blank to be entered therebetween as the turret rotates to advance the blank to station F, are closed to operate on the tip while the turret is paused at said station, and are opened again to permit the blank to leave the rolls when the turret resumes indexing.

The rolls may be adjusted relative to each other in any suitable manner. As here shown, the lower end of housing 135 is provided with a stud 145. Integral with said stud is an eccentric pin 146 which engages a sleeve 147 mounted in the lower end of the housing bore. Sleeve 147 is reduced at its lower end to receive a tapered cam 148 (Figs. 7 and 8) which is made fast to sleeve 147 by screw 149. Tapered cam 148 engages the cone-shaped upper ends 150 of the tip-forming rolls 85. By turning the eccentric pin 146 in one direction or the other, the sleeve 147 and cam 148 are either raised or lowered to regulate the distance that said rolls are separated from one another.

Rod 87 may be raised and locked in inoperative position, whenever desired, by means of spring-tensioned swing lever 127' (see Figs. 2 and 4). Fast on rod 87 is a latch block 128 to which block 125 may be latched by means of flat latching spring 127 secured at its lower end to block 125. Lever 127' is pivoted on upright 127$^a$ rising from bracket 121 and is adapted to be swung manually forward and away from block 128. It is tensioned by a compression spring 127$^b$ coiled around said upright which normally holds lever 127' away from block 128. When lever 127' is swung beneath block 128 block 125 and rod 87 are locked in the inoperative position shown in Fig. 2.

While rolls 85 are at work, the tip is continuously bathed in softening flame from the stationary burners 86. When the tip is completed and just before the turret is ready to step, the bore-forming rod 87 is retracted from the tip bore a distance sufficient to clear the tip by sending air or other pressure medium into cylinder 118, and slide 136 is restored to the position of Fig. 8 by the pressure within cylinder 133. Before the rod 87 is thus moved into its retracted position, the rolls are inoperatively positioned by admitting fluid pressure to the piston 132 in the cylinder 133 to actuate the slide block 136. Such actuation of the slide block 136 pivots the arms 138 against the action of the springs 141 to position the rolls 85 inoperatively. Whenever the fluid pressure on piston 132 is relieved, the springs 141 immediately become effective to position the rolls 85 operatively and to force the block 136 upwardly.

Before leaving station F, opposite edges of the barrel flange may be cut off and the cut edges of the flange fire-smoothed.

The flange cutting mechanism comprises two opposite pairs of vertically reciprocable shearing cutters 88 and 89. These are advanced and withdrawn, and opened and closed, in timed relation to the other parts of the machine by mechanism now to be described.

Such mechanism includes a pressure cylinder 152, the supply of pressure to which is controlled by one of the cam rings 52. Fast to the piston 153 of cylinder 152 is an actuating rod 154 (see Figs. 4 and 5) which is guided as at 155 through the cylinder head.

Fixed to the outer end of rod 154 is a tapered cam 156 which acts against a pair of cam rolls 157 rotatably mounted at the rear ends of a pair of arms 158. Arms 158 are pivoted between their ends at 159 within a pair of brackets 159' and at their forward ends are spaced apart a distance to straddle a pair of adjusting plates 160.

Plates 160 are adjusted by means of nuts and set screws 161 extending through arms 158, and the under sides of said plates are spaced apart by a coil spring 162 which is mounted in a recess in a third arm 163 disposed between arms 158 and said plates.

Arm 163 is pivoted between its ends at 164 to the brackets 159' and at its outer end is recessed to receive one end of a coil spring 165, the other end of which is received in a recess formed in cam 156.

The cutters 88 and 89 are adjustably mounted on the plates 160 by means of adjusting screws 166.

Extending through cam 156 is a pin 167 which engages the bifurcated end of an arm 168 pivoted at 169 to brackets 159'. Pinned at 170 to arm 168 is one end of a coil spring 171. The opposite end of spring 171 is anchored at 172 to the cylinder 152 near its rear end (Fig. 5) and its tension may be regulated in any suitable manner, as by thumb screw 173.

Pivot pins 159 work in elongated slots 174 in the side brackets 159'. The purpose of these slots is to permit the cutters to be moved into position before they are actuated. Anchored at one end to said pins is a pair of coil springs 175. The opposite ends of said springs are anchored at 176 to the sides of the brackets. Arm 163 is provided with ears 177 forming bearings for pins 159.

The lowermost ear carries a roll 178 acting on a leaf spring 179, which is fixedly mounted on an arm 180 (see Fig. 4) pivoted at its rear end at 181 between brackets 159'. Fastened to arm 180 by the same fastening which mounts leaf spring 179 is an oppositely extending leaf spring 182, the free end of which bears against the under side of the head of cylinder 152.

Fast to the forward end of arm 180 is a stepped lug 183 which is engageable within any of the notches 10 in the spindle base 9 in order to stop rotation of the arbor while cutters 88—89 are at work.

Spring 165 is of greater power than the combined power of springs 175 so that as said spring 165 is compressed, cutters 88—89 will be advanced as a unit into working position. Cam 156 acting on rolls 157 causes the cutters to close on one another, and spring 162 opens them after they have completed their cut.

After the cutters have operated, the pressure in cylinder 152 is relieved and spring 171 withdraws arm 168, relieving tension of spring 165 and permitting springs 175 to retract the cutters.

While the cutters are at work, the barrel flange is continuously bathed in softening flame from the stationary burner 90. This flame also fire-polishes the cut edges of the flange.

Before leaving station F, the globule of excess glass 91 is also cut off by means of pivoted cutter 92.

Cutter 92 is rotatably mounted at the free end of an arm 184 (see Fig. 1). Arm 184 is pivoted at 185 to an overhanging bracket 186 on head plate 45. Also pivoted on pivot 185 is an inwardly extending actuating arm 187, the inner end of which is adapted to be engaged by the piston 188 of a cylinder 189. The supply of fluid under pressure to cylinder 189 is controlled by one of the cam rings 52, and said cylinder is normally under pressure.

When the proper cam ring 52 operates, the pressure in said cylinder is relieved, and a spring 190, which is anchored at one end to arm 187 and at its other end to an adjustable screw 191 carried by a projection 192 extending from said cylinder, operates to draw arm 187 inwardly towards the piston, thereby forcing cutter 92 against the globule of glass at the tip end of the barrel.

The frictional contact of said cutter with the rotating barrel causes the cutter to rotate and cut off the globule of glass, after which the cutter is retracted. Such retraction results from the fact that only enough time is allowed the cutter to complete its work before the pressure is again built up in cylinder 189 to the point where piston will be projected against the inner end of arm 187 to rock said arm in the opposite direction against the action of spring 190 and thereby restore it to position.

The operations of forming the tip, slabbing off the flange, and cutting off the globule of excess glass are all completed at station F before the turret resumes indexing.

The continued steps of the turret carry the formed barrel successively through positions G to O at which latter position the barrel is cool enough to be withdrawn from its arbor.

In practice, of course, with the machine fully producing, all arbors at all positions, except position A, are filled with blanks in various stages of fabrication.

Although I have described and illustrated my invention in its adaptation to the manufacture of syringe barrels which are cylindrical from end to end, it will be understood that such disclosure is illustrative and not limiting and that the principles of my invention may be applied to the manufacture from glass tubing of many other articles of uniform dimension or capacity, as for example, medicament-containing ampules, and the tubes of uniform bore used in flow meters.

Various modifications in mechanical structure and design may likewise be resorted to within the spirit and scope of my invention as defined by the appended claims.

What I therefore claim and desire to secure by Letters Patent is:

1. In a machine of the class described, a turret having a bearing, a continuously driven main shaft journalled in said bearing, a cam shaft adjacent said main shaft, driving connections between said main shaft and said cam shaft, a mutilated stepping gear on said cam shaft and a gear on said bearing for rotating said turret step by step, a multiple ring timing cam surmounting said main shaft and rotated thereby, a cam on said cam shaft, a plurality of pistons and cylinders arranged concentrically about said timing cam at different elevations relative thereto for independent actuation by the several cam rings of said timing cam, a traversing burner located adjacent the periphery of said turret and actuated by the cam on said cam shaft, a plurality of spaced continuously rotating work-supporting arbors arranged about the periphery of said turret for successive presentation to said burner at each step in the indexing movement of said turret, means for rotating said arbors, a first and a second set of sizing and shaping rolls arranged adjacent the rotative path of said turret at spaced points that are substantially opposite points where the turret comes to rest at each step, and means operated by certain of said pistons and cylinders for successively moving said sets of rolls into and out of coaction with pieces of work on said arbors in time to the indexing movements of the turret.

2. A machine of the class described, comprising a frame, an intermittently rotatable turret journaled thereon, a plurality of equally spaced continuously rotating spindles arranged about the periphery of said turret means for rotating said spindles, work-supporting arbors secured to said spindles, a continuously rotating timing cam mounted on said turret, a set of sizing and shaping rolls mounted opposite one of the points of rest in the step-by-step travel of the turret, means operated by said timing cam in time to the indexing movements of the turret for opening said roll set as a unit relative to each arbor as each arbor is presented to the rolls of said set, means for closing the rolls of said set while the turret is paused in its indexing movement, and a burner located adjacent said roll set for directing a softening flame on the piece of work to soften it for shaping by the rolls of said set.

3. A machine for producing glass syringe barrels or like uniformly dimensioned articles by a series of fire-sizing and shaping operations, comprising a support, a revoluble turret, a plurality of rotatable spindles mounted upon said turret and equally spaced about the periphery thereof, arbors secured to said spindles and each having a shoulder for supporting one end of a tubular glass blank inserted endwise thereover, means for continuously rotating said spindles about their axes, a barrel forming mechanism and an independent tip-forming mechanism carried by said support in the path of said spindles and spaced from each other a predetermined distance, means to index said turret to position each of said spindles successively in operative proximity first to said barrel-forming mechanism and then to said tip-forming mechanism, said barrel-forming mechanism comprising a pivoted set of spaced barrel forming rolls, an axially movable end-pressure device, and a longitudinally movable burner, and said tip-forming mechanism comprising a pivoted set of spaced tip-forming rolls, an axially movable bore-forming member, and a burner, means timed to the indexing of the turret for moving said barrel-forming rolls into and out of coaction with a blank on an arbor when said arbor is indexed into operative proximity to said barrel-forming rolls, means to move said end-pressure device against the unsupported end of the blank to urge said blank against its arbor while the barrel-forming rolls are closed upon the blank, means for imparting traversing movements to said longitudinally movable burner thereby to apply softening flame to the blank substantially from end to end thereof while said blank is being acted upon by said barrel-forming rolls and said end-pressure device, means timed to the indexing of the turret for moving said tip forming rolls into and out of coaction with a formed blank on an arbor when said arbor is indexed into operative proximity to said tip-forming rolls, and means to move the bore-forming member against the tip end of the formed blank while the tip forming rolls are closed upon said blank.

4. The machine of claim 3, the axes of both the barrel-forming rolls and of the tip-forming rolls being substantially parallel to the axes of the spindles.

5. The machine of claim 3, the barrel-forming rolls and the tip-forming rolls being equidistantly spaced from each other.

6. The machine of claim 3, the arbors having sizing portions below their blank-supporting shoulders, and the barrel-forming rolls having sizing portions for coaction with said sizing portions of said arbors.

7. The machine of claim 3, the barrel-forming rolls having peripheral grooves adjacent the blank-supporting shoulders of the arbor for the formation of a flange adjacent the supported end of a blank entered between said rolls.

8. A machine for producing glass syringe barrels or like uniformly dimensioned articles by a series of fire-sizing and shaping operations, comprising a base, a stationary support and a revoluble turret mounted on said base, a plurality of rotatable spindles mounted upon said turret and equally spaced about the periphery thereof, arbors secured to said spindles and each having a shoulder for supporting one end of a tubular glass blank inserted endwise thereover, means for continuously rotating said spindles about their axes, a barrel-forming mechanism and an independent tip-forming mechanism carried by said support in the path of said spindles and spaced from each other a predetermined distance, means to index said turret to position each of said spindles successively in operative proximity first to said barrel-forming mechanism and then to said tip-forming mechanism, said barrel forming mechanism comprising a pivoted set of spaced barrel-forming rolls, an axially movable end pressure device, and a longitudinally movable burner, and said tip-forming mechanism comprising a pivoted set of spaced tip-forming rolls, an axially movable bore-forming member, and a burner, independent actuating mechanisms each timed to the indexing of the turret for independently opening the respective sets of rolls to permit blanks on their arbors to be entered between said sets of rolls while said arbors are being indexed into operative proximity to said sets of rolls, and for independently re-opening said sets of rolls when the turret is about to resume its indexing movement, means for independently closing said sets of rolls against said blanks while the turret is paused in its indexing movement, means timed to the indexing of the turret for moving the end-pressure device axially against the unsupported end of a blank to urge said blank against its arbor while the barrel-forming rolls are closed upon said blank and to withdraw it from the blank when said rolls are re-opened, means timed to the indexing of the turret for imparting traversing movements to the longitudinally movable burner thereby to apply softening flame to a blank substantially from end to end thereof while said blank is being acted upon by said barrel forming rolls and said end-pressure device, and means timed to the indexing of the turret for moving the bore-forming member axially against the tip end of a blank while the tip-forming rolls are closed upon said blank and to withdraw it from said blank when said rolls are re-opened.

9. A machine for producing uniformly dimensioned articles by a series of fire-sizing and shaping operations, comprising a support, a revoluble turret, a plurality of rotatable spindles mounted upon said turret and equally spaced about the periphery thereof, arbors secured to said spindles and each having a shoulder for supporting one end of a tubular glass blank inserted endwise thereover, means for continuously rotating said spindles about their axes, a first set and a second set of sizing and shaping rolls carried by said support in the path of said spindles and spaced from each other a predetermined distance, means to index said turret to position each of said spindles successively in operative proximity to each of said sets of rolls, independent actuating mechanisms each timed to the indexing of the turret for independently opening the respective sets of rolls to permit blanks on their arbors to be entered between said sets of rolls while said arbors are being indexed into operative proximity to said sets of rolls and for independently re-opening said sets of rolls when the turret is about to resume its indexing movement, means for independently closing said sets of rolls against said blanks while the turret is paused in its indexing movement, an end-pressure device located adjacent said first set of rolls for exerting end pressure on the unsupported end of a blank entered between the first set of rolls, means timed to the indexing of the turret for actuating said device, and a burner adjacent each set of rolls for bathing in softening flames selected portions of blanks entered between said sets of rolls.

10. The machine of claim 1, a retractible end pressure device located adjacent the first set of said rolls, and means operated by one of said pistons and cylinders in time to the indexing of the turret for moving said device into position to exert end pressure on a piece of work entered between said set of rolls.

11. The machine of claim 1, a retractible wire located adjacent the second set of said rolls, and means operated by one of said pistons and cylinders in time to the indexing of the turret for moving said wire into one end of a piece of work entered between said set of rolls.

12. A machine for producing uniformly dimensioned articles by a series of fire-sizing and shaping operations, comprising a support, a revoluble turret, a plurality of rotatable spindles mounted upon said turret and equally spaced about the periphery thereof, arbors secured to said spindles and each having a shoulder for supporting one end of a tubular glass blank inserted endwise thereover, means for continuously rotating said spindles about their axes, a first set and a second set of sizing and shaping rolls carried by said support in the path of said spindles and spaced from each other a predetermined distance, means to index said turret to position each of said spindles successively in operative proximity to each of said sets of rolls, a timing cam, means for continuously rotating said cam, a series of independent control devices independently actuated by said cam, means operated by one of said control devices for opening the first set of rolls to permit a blank on its arbor to be entered between said first set of rolls while said arbor is being indexed into operative proximity to said first set of rolls, and for re-opening said first set of rolls when the turret is about to resume its indexing movement, means for closing said first set of rolls against said blank while the turret is paused in its indexing movement, an end pressure device located adjacent said first set of rolls for exerting end pressure on the unsupported end of a blank entered between said first set of rolls, means timed to the indexing of the turret for actuating said end-pressure device, a traversing burner adjacent said first set of rolls for bathing in softening flame selected portions of a blank entered between said set of rolls, means for imparting trasversing movements to said burner, means operated by another of said control devices for opening the second set of rolls to permit a blank on its arbor to be entered therebetween while said arbor is being indexed into operative proximity to said second set of rolls and for re-opening said second set of rolls when the turret is about to resume its indexing movement, means for closing said second set of rolls while the turret is paused in its indexing movement, an axially movable device located adjacent said second set of rolls, means timed to the indexing of the turret for actuating said axially movable device, and a burner adjacent said second set of rolls for bathing in softening flame selected portions of a blank to be shaped by said second set of rolls.

JESSE CONRAD SMITH.